(12) United States Patent
Radic

(10) Patent No.: US 11,973,428 B2
(45) Date of Patent: Apr. 30, 2024

(54) FEEDBACK VOLTAGE MODULATION TO REDUCE POWER CONVERTER QUIESCENT CURRENT

(71) Applicant: Silanna Asia Pte Ltd, Singapore (SG)

(72) Inventor: Aleksandar Radic, British Columbia (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 18/322,074

(22) Filed: May 23, 2023

(65) Prior Publication Data

US 2023/0299683 A1 Sep. 21, 2023

Related U.S. Application Data

(63) Continuation of application No. 17/806,872, filed on Jun. 14, 2022, now Pat. No. 11,699,955.

(Continued)

(51) Int. Cl.
*H02M 3/335* (2006.01)
*H02M 1/00* (2006.01)

(52) U.S. Cl.
CPC ..... *H02M 3/33523* (2013.01); *H02M 1/0032* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233;
(Continued)

(56) References Cited

U.S. PATENT DOCUMENTS 7,035,119 B2 4/2006 Koike
9,154,038 B2 10/2015 Fang et al.
(Continued)

FOREIGN PATENT DOCUMENTS

| CN | 106230270 A | 12/2016 |
|---|---|---|
| JP | 2014222955 A | 11/2014 |
| KR | 1020060007919 A | 1/2006 |

OTHER PUBLICATIONS

International Search Report and Written Opinion dated Sep. 27, 2022 for PCT Patent Application No. PCT/IB2022/055514.
(Continued)

*Primary Examiner* — Jeffrey A Gblende
(74) *Attorney, Agent, or Firm* — MLO, a professional corp.

(57) ABSTRACT

A method involves determining that a power converter is in a discontinuous, no-load, or ultra-light load mode of operation. In response, a voltage amplitude of a feedback signal of the power converter rises towards a voltage amplitude that is greater than or equal to a first threshold voltage level. Upon determining that the voltage amplitude of the feedback signal is greater than or equal to the first threshold voltage level, a first enabling pulse is issued to a primary side switch of the power converter to reduce a voltage amplitude of the feedback signal. Upon determining that the voltage amplitude of the feedback signal is greater than or equal to a second threshold voltage level, a normal mode of operation of the power converter is entered.

20 Claims, 4 Drawing Sheets

Related U.S. Application Data

(60) Provisional application No. 63/202,679, filed on Jun. 21, 2021.

(58) Field of Classification Search
CPC .......... H02M 1/12; H02M 3/07; H02M 7/219; H02M 7/4815; H02M 1/0048; Y02B 70/1491
See application file for complete search history.

(56) References Cited

U.S. PATENT DOCUMENTS

| | | |
|---|---|---|
| 9,413,250 B2 | 8/2016 | Zhao et al. |
| 9,590,513 B2 | 3/2017 | Fahlenkamp |
| 10,622,902 B2 | 4/2020 | Cao et al. |
| 2011/0133829 A1 | 6/2011 | Huang |
| 2011/0280051 A1 | 11/2011 | Halberstadt |
| 2014/0016373 A1 | 1/2014 | Zhang et al. |
| 2015/0357927 A1 | 12/2015 | Zhang et al. |
| 2019/0341852 A1 | 11/2019 | Fahlenkamp et al. |

OTHER PUBLICATIONS

Notice of Allowance and Fees dated Mar. 2, 2023 for U.S. Appl. No. 17/806,872.

FEEDBACK VOLTAGE MODULATION TO REDUCE POWER CONVERTER QUIESCENT CURRENT

RELATED APPLICATIONS

This application is a continuation of U.S. patent application Ser. No. 17/806,872, filed Jun. 14, 2022, which claims priority to U.S. Provisional Patent Application No. 63/202,679, filed Jun. 21, 2021, all of which are incorporated by reference herein in their entirety for all purposes.

BACKGROUND

Power converters, such as flyback converters and other switch-mode power supplies, are common in modern power supplies and are utilized in both alternating current ("AC") to direct current ("DC") conversion, and DC-to-DC conversion, with galvanic isolation between the input and outputs of the power supply. Such power converters have a magnetic element that is split to form a transformer which provides the galvanic isolation. In general, power converters have a primary side and a secondary side. The primary side of the power converter includes a primary side switch (such as, for example, a transistor), and the secondary side often includes another switch (such as, for example, a diode) to rectify the current produced by the secondary side of the power converter. In operation, such power converters operate in a switched-mode that periodically turns on and off the primary side switch that supplies current to the magnetic element.

Optocouplers are often utilized in power converters to convey information (e.g., feedback) from the secondary side of the power converter to the primary side of the power converter. Such information is often required to achieve tight regulation of the output voltage and/or current while maintaining isolation between the two voltage domains. To ensure sufficient optocoupler current-transfer ratio and bandwidth during normal operation, significant quiescent current is often required (e.g., up to 1 mA). Unfortunately, this can result in unacceptable no-load power consumption (>10 mW just from the optocoupler) during no-load mode of operation, making it difficult to meet stringent (<20 mW) regulatory no-load consumption requirements.

SUMMARY

In some embodiments, a method involves determining, by a primary side controller of a power converter, that the power converter is in a no-load or ultra-light load mode of operation. In response to determining that the power converter is in a no-load or ultra-light load mode of operation, the primary side controller allows a voltage amplitude of a feedback signal to rise towards a voltage amplitude that is greater than or equal to a first threshold voltage level. Upon determining, by the primary side controller, that the voltage amplitude of the feedback signal is greater than or equal to the first threshold voltage level, the primary side controller issues a first sequence of one or more enabling pulses to a primary side switch of the power converter to reduce a voltage amplitude of the feedback signal. Upon determining, by the primary side controller, that the voltage amplitude of the feedback signal is greater than or equal to a second threshold voltage level, the primary side controller enters a normal mode of operation of the power converter. A second sequence of one or more enabling pulses are issued, by the primary side controller, to the primary side switch of the power converter during normal operation of the power converter. The voltage amplitude of the feedback signal is less than the first threshold voltage level during the normal mode of operation of the power converter.

In some embodiments, a power converter includes a primary side controller at a primary side of the power converter, an optocoupler circuit that provides a feedback signal from a secondary side of the power converter to the primary side controller, the feedback signal being representative of an output level of the power converter, and a primary side switch at the primary side of the power converter, the primary side switch being controlled by the primary side controller based on a voltage amplitude of the feedback signal. The primary side controller is operable to allow a voltage amplitude of the feedback signal to rise towards a voltage amplitude that is greater than or equal to a first threshold voltage level in response to determining that the power converter is in a no-load or ultra-light load mode of operation, issue a first sequence of one or more enabling pulses to the primary side switch to reduce a voltage amplitude of the feedback signal in response to determining that the voltage amplitude of the feedback signal is greater than or equal to the first threshold voltage level, enter a normal mode of operation of the power converter in response to determining that the voltage amplitude of the feedback signal is greater than or equal to a second threshold voltage level, and issue a second sequence of one or more enabling pulses to the primary side switch of the power converter during normal operation of the power converter, the voltage amplitude of the feedback signal being less than the first threshold voltage level during the normal mode of operation of the power converter.

DETAILED DESCRIPTION

Power converters, such as flyback converters and other switch-mode power supplies, are common in modern power supplies and are utilized in both alternating current ("AC") to direct current ("DC") conversion, and DC-to-DC conversion, with galvanic isolation between the input and outputs of the power supply. Optocouplers are often utilized in power converters to convey information (e.g., feedback) from the secondary side of the power converter to the primary side of the power converter. To ensure a sufficiently large optocoupler current-transfer ratio and bandwidth during normal operation of a power converter, a significant optocoupler quiescent current is often required. Unfortunately, significant quiescent current can cause unacceptable no-load power consumption during a no-load mode of operation, thereby making it difficult for the power converter to meet stringent regulatory no-load consumption requirements.

Systems and methods are disclosed herein to substantially reduce or eliminate optocoupler-related no-load power loss and thereby reduce overall power converter power draw. Such systems and methods also substantially reduce or eliminate the optocoupler-related power loss and reduce overall power converter power draw under ultra-light load conditions (an ultra-light load is a load that consumes substantially less power than a normal load).

Such systems and methods reduce the optocoupler quiescent current during no-load and ultra-light load conditions by modulating a primary side feedback resistor voltage, as compared to conventional solutions that may modulate a resistance of the feedback resistor itself or that may generate a fixed optocoupler current amplitude. Because the resistance of the feedback resistor is not modulated (i.e., it is fixed), systems and methods disclosed herein advantageously enable a feedback resistor value to be selected by an end-user based on their feedback loop design while at the same time allowing for an order of magnitude reduction of the quiescent current reduction during no-load and ultra-light load conditions. Additionally, because the optocoupler current is allowed to vary in amplitude during operation of the power converter, the power converter as disclosed herein is advantageously able to respond quickly to changes in load conditions as compared to power converters that use a fixed optocoupler current.

Figure 1:
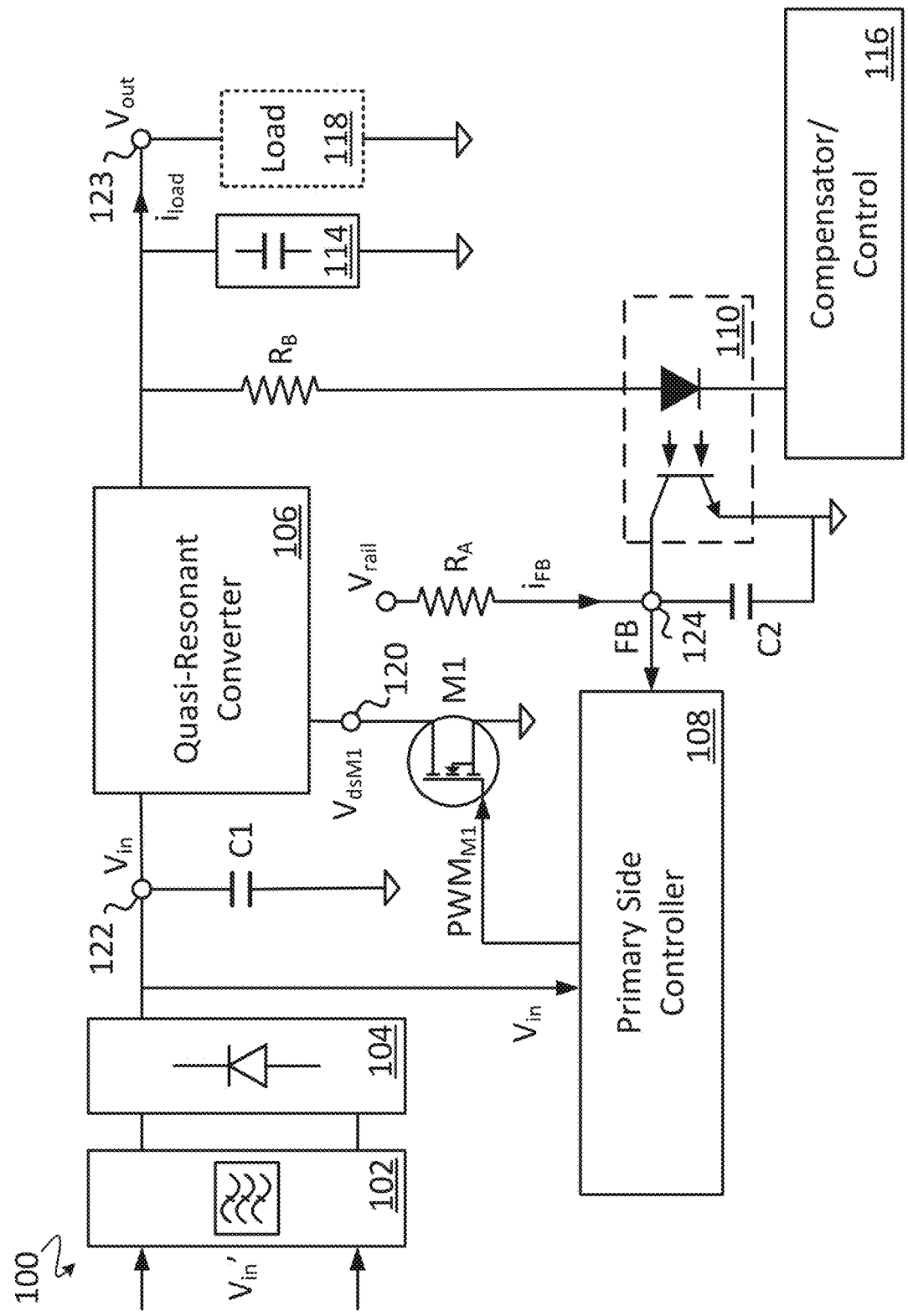
FIG. 1 is a simplified schematic of a power converter, in accordance with some embodiments.

FIG. 1 is a simplified circuit schematic of a power converter 100, in accordance with some embodiments. Some elements of the power converter 100 have been omitted from FIG. 1 to simplify the description of the power converter 100 but are understood to be present. In general, the power converter 100 includes an input voltage filter block 102, a rectifier block 104 (in the case of AC input), a quasi-resonant converter circuit 106 (or other switch-mode power converter circuit), a primary side controller 108, an output buffer circuit 114, an optocoupler circuit 110, a compensator and/or control circuit 116, an input voltage buffer capacitor C1, a primary side switch M1, a feedback signal filter capacitor C2, and feedback resistors $R_A$, $R_B$, coupled as shown. The power converter 100 is connected to a load 118. Also shown is a drain-source voltage $V_{dsM1}$ of the primary side switch M1 at a signal node 120, a primary side switch control signal $PWM_{M1}$, an input voltage $V_{in}'$, a conditioned input voltage $V_{in}$ at a signal node 122, an output voltage $V_{out}$ at a signal node 123, an output current $i_{load}$, a feedback signal FB at a feedback signal node 124, a feedback current $i_{FB}$, and a feedback circuit rail voltage $V_{rail}$.

The optocoupler circuit 110, also called an optoisolator circuit, is a circuit that transmits a signal between two galvanically isolated circuits (i.e., a secondary side of the power converter 100 at the signal node 123, and a primary side of the power converter 100 at the signal node 122).

The power converter 100 is configured to receive the input voltage $V_{in}'$ and to provide the output voltage $V_{out}$ and the output current $i_{load}$ to the load 118 based on an on-time and an off-time of the primary side switch M1. The optocoupler circuit 110 provides an indication of a current amplitude of the output current $i_{load}$, and/or an indication of the output voltage $V_{out}$, to the primary side controller 108 via the feedback signal FB at the feedback signal node 124. In some embodiments, the compensator and/or control circuit 116 additionally modify an amplitude of the feedback signal FB to meet desired regulation and control requirements of the power converter 100.

The on-time and the off-time of the primary side switch M1 are controlled by the primary side controller 108. The primary side controller 108 is configured to receive the feedback signal FB and generate the primary side switch control signal $PWM_{M1}$ to control the on-time and off-time of the primary side switch M1 based on a voltage amplitude of the feedback signal FB. Each enabling pulse of the primary side switch control signal $PWM_{M1}$ enables the primary side switch M1 for a duration of that pulse, thereby transferring power from the primary side of the power converter 100 to the secondary side of the power converter 100.

In some embodiments, the quasi-resonant converter circuit 106 is implemented as a fly-back, forward, boost, or buck power converter. In some embodiments, the feedback rail voltage $V_{rail}$ is generated using a voltage regulator, such as an LDO (low-dropout) regulator (e.g., within the primary side controller 108), based on the conditioned input voltage $V_{in}$.

To ensure a sufficient optocoupler current-transfer ratio and acceptable bandwidth during normal operation of the power converter 100, a significant quiescent current of the optocoupler circuit 110 is often required (e.g., up to 1 mA). Unfortunately, a high quiescent current can result in unacceptable no-load power consumption of the power converter 100 (e.g., greater than 10 mW just from the optocoupler circuit 110), thereby making it difficult to meet stringent regulatory no-load consumption requirements (e.g., less than 20 mW). Systems and methods described with reference to FIG. 2 advantageously reduce, and sometimes eliminate, the optocoupler-related no-load, or ultra-light load, power loss and thereby reduce an overall power draw of the power converter 100.

Figure 2:
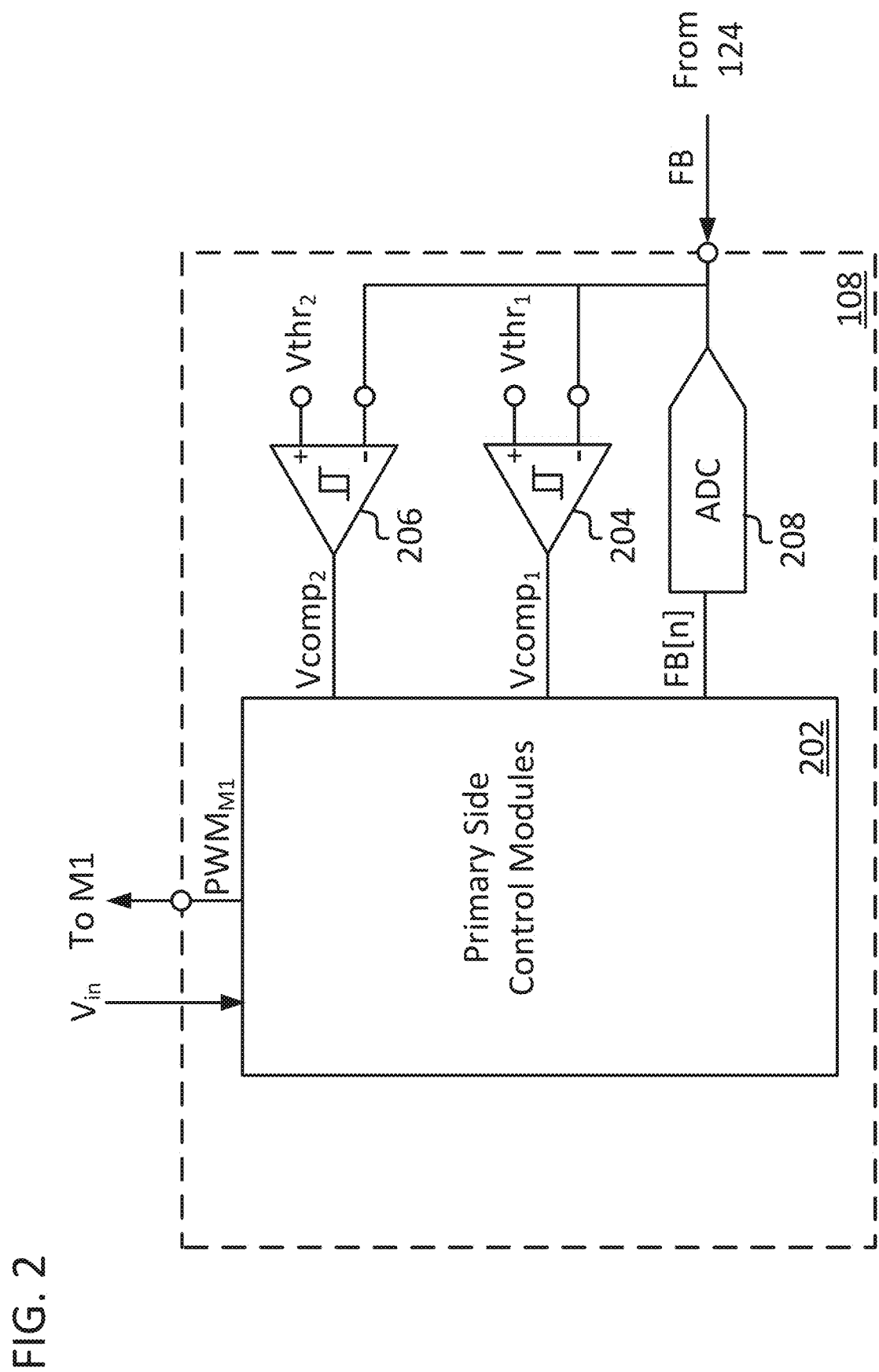
FIG. 2 is a simplified schematic of a primary side controller of the power converter shown in FIG. 1, in accordance with some embodiments.

FIG. 2 is a simplified circuit schematic of the primary side controller 108, in accordance with some embodiments. Some elements of the primary side controller 108 have been omitted from FIG. 2 to simplify the description of the primary side controller 108 but are understood to be present. In general, the primary side controller 108 includes primary side control modules 202, a first comparator circuit 204, a second comparator circuit 206, and an analog to digital converter (ADC) 208, coupled as shown. As shown, the first comparator circuit 204 is configured to produce a first comparison signal $Vcomp_1$ based on a comparison of a first threshold voltage $Vthr_1$ received at a non-inverting input, and the feedback signal FB received at an inverting input. The second comparator circuit 206 is configured to produce a second comparison signal $Vcomp_2$ based on a comparison of a second threshold voltage $Vthr_2$ received at a non-inverting input and the feedback signal FB received at an inverting input. The first comparison signal $Vcomp_1$ and the second comparison signal $Vcomp_2$ are received at the primary side control modules 202. In some embodiments, the first comparator circuit 204 and the second comparator circuit 206 are configured to generate their respective comparison signals $Vcomp_1$ and $Vcomp_2$ using hysteresis. In some embodiments, the primary side control modules 202 include one or more voltage regulators (e.g., LDOs), digital to analog converters, or other voltage supply circuits to generate the first threshold voltage $Vthr_1$, the second threshold voltage $Vthr_2$, and the feedback rail voltage $V_{rail}$.

In some embodiments, $Vthr_1$ is selected to be about 90% to 95% of the feedback rail voltage $V_{rail}$ and $Vthr_2$ is selected to be about 97% to 99% of the feedback rail voltage $V_{rail}$. For example, in some embodiments, the feedback rail voltage $V_{rail}$ shown in FIG. 1 is about 5 V, the first threshold voltage $Vthr_1$ shown in FIG. 2 is about 4.7 V, and the second threshold voltage $Vthr_2$ shown in FIG. 2 is about 4.9 V. The ADC 208 is configured to generate a digital representation FB[n] (e.g., 9-bits) of the feedback signal FB. The digital representation FB[n] is received at the primary side control modules 202 and used by the primary side control modules 202 to generate the primary side switch control signal $PWM_{M1}$ during normal operation of the power converter 100 to control the on-time and off-time of the primary side switch M1. Operation of the primary side controller 108 is described with reference to FIG. 3.

Figure 3:
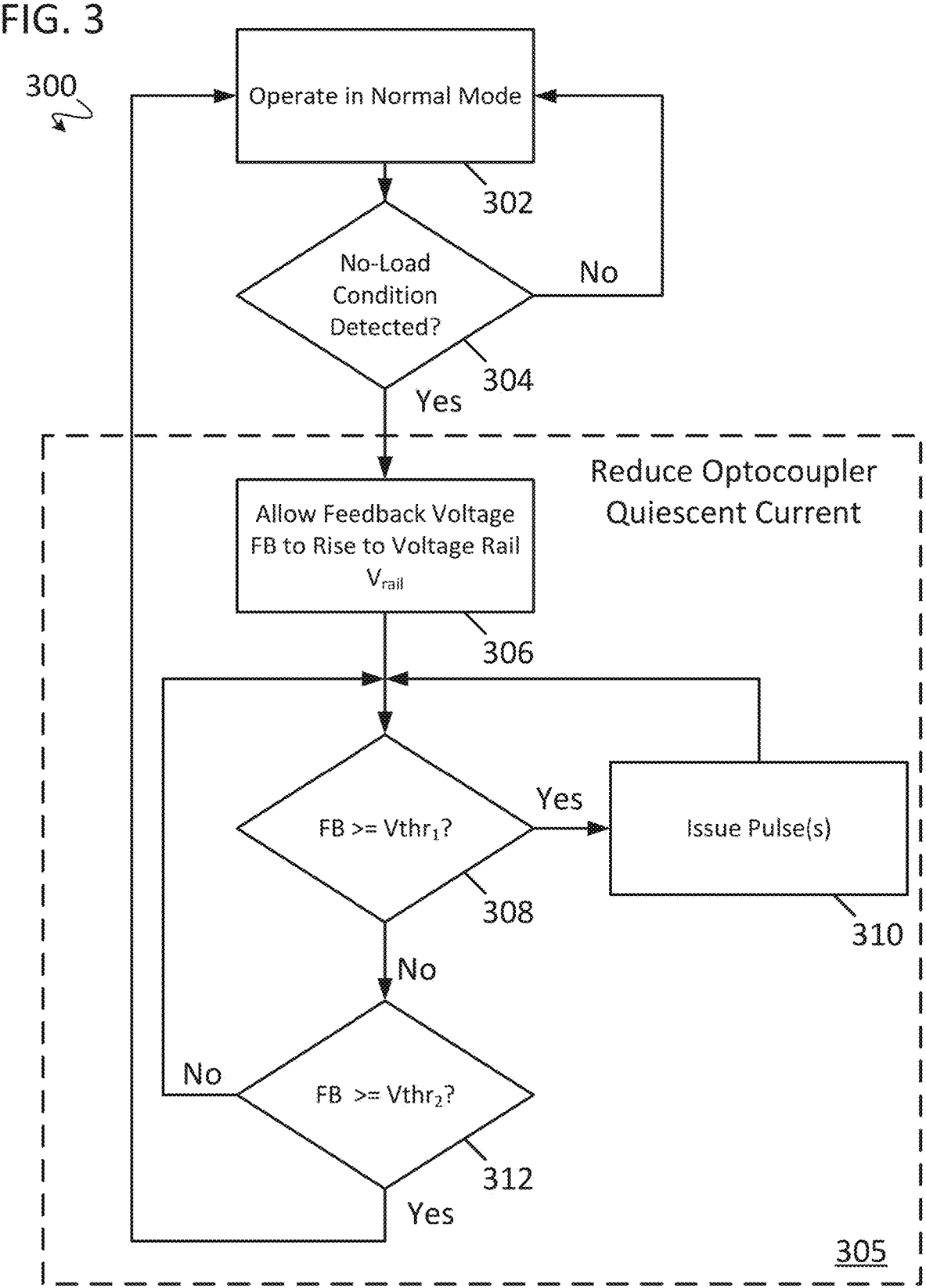
FIG. 3 is a simplified portion of a process carried out by the primary side controller shown in FIG. 2 to reduce power converter quiescent current, in accordance with some embodiments.

FIG. 3 provides a portion of an example process 300 for reducing power converter optocoupler quiescent current during no-load, or ultra-light load operating conditions of the power converter 100, in accordance with some embodiments. The particular steps, the order of steps, and the combination of steps are shown for illustrative and explanatory purposes only. Other embodiments can implement different steps, orders of steps, and combinations of steps to achieve similar functions or results. The example process 300 is described with reference to FIG. 1 and FIG. 2.

At step 302, the power converter 100 is operating in a normal mode. In some embodiments, the normal mode is a quasi-resonant mode of operation or another mode of operation of the power converter 100 for providing a regulated voltage and/or current to the load 118 (i.e., the load 118 is not absent or ultra-light). During normal mode of operation, power is transferred from the primary side of the power converter 100 to the secondary side of the power converter 100 based on a sequence of one or more pulses of the primary side switch control signal $PWM_{M1}$, the power transfer being regulated in accordance with the digital representation FB[n] of the feedback signal FB.

At step 304, the primary side control modules 202 determine if a no-load, or ultra-light load, condition has been detected. For example, in some embodiments, a substantial amount of current flow through the feedback resistor $R_B$ may indicate to the primary side control modules 202 that the power converter 100 is in a no-load, or ultra-light load, condition. In other embodiments, if a voltage level of the feedback signal FB falls below a third threshold level, the primary side control modules 202 may determine that the power converter 100 is in a no-load, or ultra-light load, condition. Or, in still other embodiments, if the primary side control modules 202 determine that a discontinuous mode of operation has been entered and that a period between pulses of the primary side switch control signal $PWM_{M1}$ surpasses a threshold amount of time, the primary side control modules 202 may determine that the load 118 is absent or is an ultra-light load. If it is not determined at step 304 that a no-load condition has been detected, flow of the process 300 returns to step 302, and the power converter 100 remains operating in normal mode. However, if it is determined at step 304 that a no-load, or ultra-light, load condition has been detected, flow of the process 300 continues to block 305 where a quiescent current of the optocoupler circuit 110 is advantageously reduced.

At step 306, a voltage amplitude of the feedback signal FB is allowed, by the primary side control modules 202, to rise towards the feedback rail voltage $V_{rail}$ such that an amplitude of the feedback signal FB becomes greater than the first threshold voltage $Vthr_1$. In some embodiments, the feedback signal FB is allowed to rise towards the feedback rail voltage $V_{rail}$ based on a change in a regulation scheme of the primary side control modules 202; for example, by not issuing an enabling pulse of the primary side switch control signal $PWM_{M1}$ in response to the increasing voltage amplitude of the feedback signal FB. As the voltage amplitude of the feedback signal FB rises towards the feedback rail voltage $V_{rail}$, power dissipation across the feedback resistor $R_A$ is reduced as compared to when the voltage amplitude of the feedback signal FB is significantly lower than the feedback rail voltage $V_{rail}$. That is, the feedback current $i_{FB}$ through the feedback resistor $R_A$ may be expressed as:

$$i_{FB} = \frac{(V_{rail} - FB)}{R_A}. \qquad \text{(Equation 1)}$$

As shown in Equation 1, as the voltage amplitude of the feedback signal FB approaches the feedback rail voltage $V_{rail}$, the feedback current $i_{FB}$ (i.e., a quiescent current of the optocoupler circuit 110) is advantageously reduced or eliminated.

If the load at the output of the power converter 100 increases such that the load is no longer an ultra-light load or entirely absent, issued pulses of the primary side switch control signal $PWM_{M1}$ may not be able to transfer enough power from the primary side of the power converter 100 to the secondary side of the power converter. As a result, a voltage amplitude of the feedback signal FB will continue to rise in voltage amplitude.

Accordingly, at step 308, the voltage amplitude of the feedback signal FB is compared to the second threshold voltage $Vthr_2$ by the second comparator circuit 206. If it is determined at step 308 that the voltage amplitude of the feedback signal FB is greater than or equal to the second threshold voltage $Vthr_2$ (i.e., more of the output current $i_{load}$ is being delivered to the load 118 instead of flowing through the feedback resistor $R_B$), a second comparison signal $Vcomp_2$ is transmitted at a first state from the second comparator circuit 206 to the primary side control modules 202 and flow of the process 300 returns to step 302 to resume operation in a normal mode. If instead at step 308 it is determined, using the second comparator circuit 206, that the voltage of the feedback signal FB is not greater than the second threshold voltage $Vthr_2$, the second comparison signal $Vcomp_2$ is transmitted at a second state from the second comparator circuit 206 to the primary side control modules 202 and flow of the process 300 continues to step 312.

The first state of the second comparison signal $Vcomp_2$ is a voltage level that indicates to the primary side control modules 202 that the voltage amplitude of the feedback signal FB is greater than or equal to the second threshold voltage $Vthr_2$. The second state of the second comparison signal $Vcomp_2$ is a voltage level that indicates to the primary side control modules that the voltage amplitude of the feedback signal FB is less than the second threshold voltage $Vthr_2$.

At step 312, the voltage amplitude of the feedback signal FB is compared to the first threshold voltage $Vthr_1$ by the first comparator circuit 204. If it is determined at step 312 that the voltage amplitude of the feedback signal FB is greater than or equal to the first threshold voltage $Vthr_1$, a first comparison signal $Vcomp_1$ is transmitted at a first state (i.e., level) from the first comparator circuit 204 to the primary side control modules 202 and flow of the process 300 continues to step 310.

At step 310, in response to receiving the first comparison signal $Vcomp_1$ at the first state, the primary side control modules 202 issue a first sequence of one or more pulses of the primary side switch control signal $PWM_{M1}$ to transfer power from the primary side of the power converter 100 to the secondary side of the power converter 100. Pulses of the primary side switch control signal $PWM_{M1}$ are issued so long as the feedback signal FB remains greater than or equal to the first threshold voltage $Vthr_1$. In some embodiments, after step 310, flow of the process 300 returns to step 308.

In other embodiments (not shown), after step 310, flow of the process 300 returns to step 306.

If instead at step 312 it is determined, using the first comparator circuit 204, that the voltage of the feedback signal FB is not greater than or equal to the first threshold voltage $Vthr_1$, the first comparison signal $Vcomp_1$ is transmitted at a second state from the first comparator circuit 204 to the primary side control modules 202 and accordingly no pulses of the of the primary side switch control signal $PWM_{M1}$ are issued. In some embodiments, flow of the process 300 then returns to step 308. In other embodiments (not shown), flow of the process 300 then returns to step 306.

The first state of the first comparison signal $Vcomp_1$ is a voltage level that indicates to the primary side control modules that the voltage amplitude of the feedback signal FB is greater than or equal to the first threshold voltage $Vthr_1$. A second state of the first comparison signal $Vcomp_1$ is a voltage level that indicates to the primary side control modules that the voltage amplitude of the feedback signal FB is less than the first threshold voltage $Vthr_1$.

Figure 4:
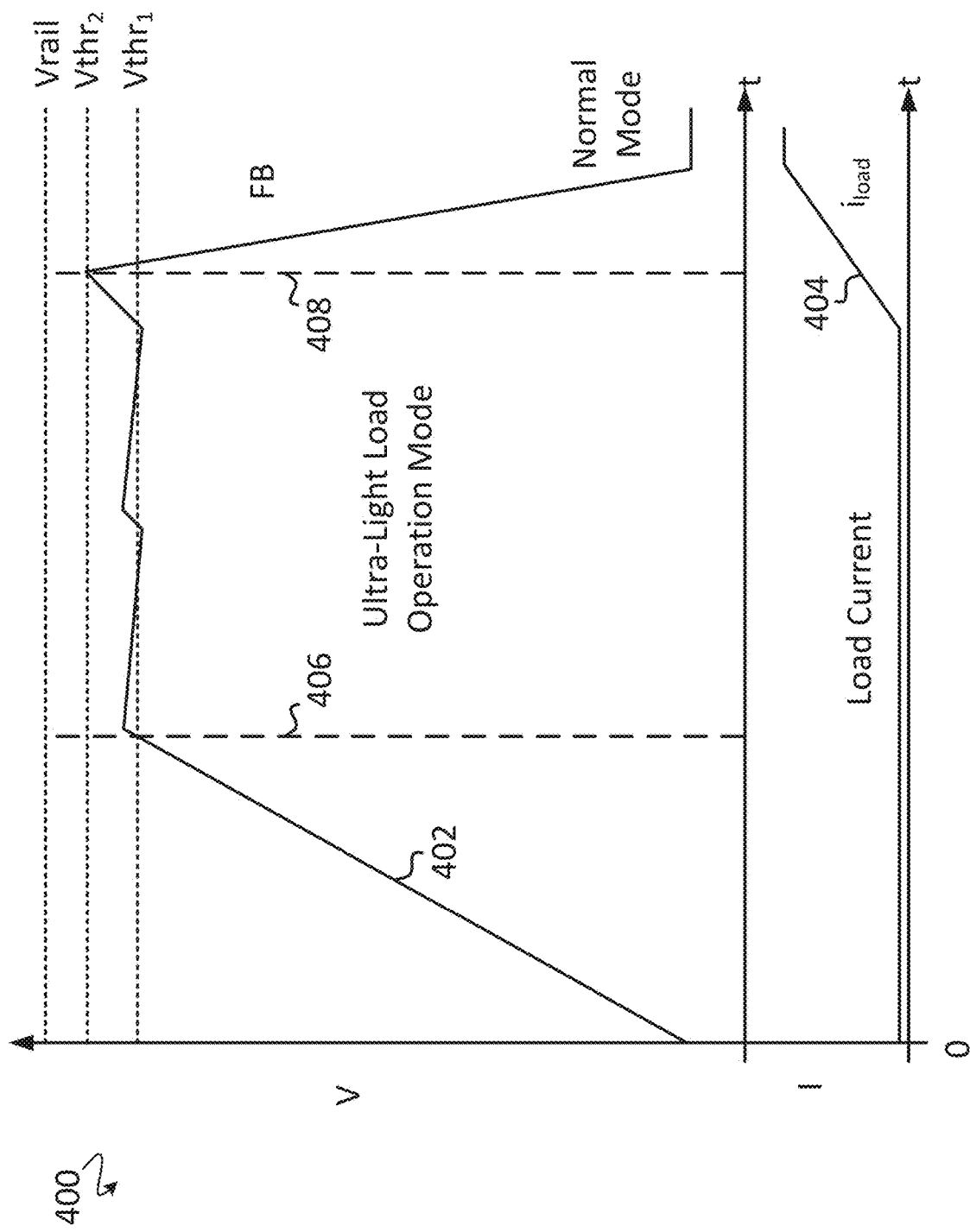
FIG. 4 shows simplified signal diagrams illustrating the process to reduce power converter quiescent current shown in FIG. 3, in accordance with some embodiments.

FIG. 4 provides a simplified signal diagram 400 illustrating operation of the process 300 by the power converter 100, in accordance with some embodiments. The signal diagrams 400 show a simplified plot of a voltage amplitude 402 of the feedback signal FB at the feedback signal node 124 and a current amplitude 404 of the output current $i_{load}$ across the same time t. At time 0, it is determined (e.g., at step 304 of the process 300) that the power converter 100 is providing the output current $i_{load}$ to an ultra-light, or no, load 118. From time 0 until the time at 406 the voltage amplitude 402 of the feedback signal FB is allowed, by regulation via the primary side control modules 202, to rise towards the feedback rail voltage $V_{rail}$. At 406, the primary side control modules 202 enter ultra-light load regulation, whereby whenever the voltage amplitude of the feedback signal FB rises above the first threshold voltage $Vthr_1$ the primary side control modules 202 issue a sequence of one or more pulses of the primary side switch control signal $PWM_{M1}$ to transfer power from the primary side of the power converter 100 to the secondary side of the power converter 100. Because the feedback signal FB remains at a voltage level that is close to the feedback rail voltage $V_{rail}$, the quiescent current of the power converter 100 is advantageously reduced (i.e., because $V_{rail}$–FB is small). In the simplified signal diagram 400, the primary side control modules 202 remain in the ultra-light mode of operation until the voltage amplitude of the feedback signal FB rises above the second threshold voltage $Vthr_2$ at time 408. Upon determining, using the second comparator circuit 206, that the voltage amplitude of the feedback signal FB is greater than the second threshold voltage $Vthr_2$, the primary side control modules 202 resume normal operation mode of the power converter 100. During normal operation mode of the power converter 100, the primary side control modules 202 regulate the output voltage Vout and/or the output current $i_{load}$ using the digital representation of the feedback signal FB[n]. During normal operation of the power converter 100, the voltage amplitude of the feedback signal FB is allowed, via regulation by the primary side control modules 202, to remain at an amplitude that is less than $Vthr_1$ to enable accurate regulation of the output voltage Vout and/or output current $i_{load}$.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   during a discontinuous mode of operation of a power converter, upon determining that a voltage amplitude of a feedback signal is greater than or equal to a first threshold voltage level, issuing, by a primary side controller of the power converter, a first enabling pulse to a primary side switch of the power converter to reduce a voltage amplitude of the feedback signal;
   upon determining, by the primary side controller, that the voltage amplitude of the feedback signal is greater than or equal to a second threshold voltage level, entering, by the primary side controller, a normal mode of operation of the power converter; and
   issuing, by the primary side controller, a second enabling pulse to the primary side switch of the power converter during normal operation of the power converter;
   wherein:
   the voltage amplitude of the feedback signal is less than the first threshold voltage level during the normal mode of operation of the power converter.

2. The method of claim 1, further comprising:
   during the discontinuous mode of operation, determining that the voltage amplitude of the feedback signal is greater than or equal to the first threshold voltage level by:
   receiving the feedback signal at a first comparator circuit of the primary side controller; and
   comparing, by the first comparator circuit, the feedback signal to the first threshold voltage level to generate a first comparison signal, the first enabling pulse being issued in response to a state of the first comparison signal.

3. The method of claim 2, further comprising:
   determining that the voltage amplitude of the feedback signal is greater than or equal to the second threshold voltage level by:
   receiving the feedback signal at a second comparator circuit of the primary side controller; and
   comparing, by the second comparator circuit, the feedback signal to the second threshold voltage level to generate a second comparison signal, wherein entering the normal mode of operation of the power converter is in response to a state of the second comparison signal.

4. The method of claim 3, wherein issuing the second enabling pulse to the primary side switch of the power converter during normal operation of the power converter comprises:
   receiving the feedback signal at an analog to digital converter (ADC) circuit of the primary side controller;

generating, by the ADC circuit, a digital representation of the feedback signal; and
issuing, by the primary side controller, the second enabling pulse based on the digital representation of the feedback signal.

5. The method of claim 1, further comprising:
during the discontinuous mode of operation, allowing the voltage amplitude of the feedback signal to rise towards the voltage amplitude that is greater than or equal to the first threshold voltage level by suspending, by the primary side controller, issuance of enabling pulses to the primary side switch of the power converter until the feedback signal is greater than or equal to the first threshold voltage level.

6. The method of claim 1, further comprising:
receiving, at the primary side controller, the feedback signal from an optocoupler circuit of the power converter, the feedback signal being developed based on a current flow through a feedback resistor coupled between a feedback voltage rail of the power converter and a node of the optocoupler circuit.

7. The method of claim 6, wherein:
the first threshold voltage level is about 90% of a voltage level of the feedback voltage rail; and
the second threshold voltage level is about 98% of the voltage level of the feedback voltage rail.

8. The method of claim 6, wherein:
a first amplitude of a feedback current through the feedback resistor when the feedback signal is greater than or equal to the first threshold voltage level is less than a second amplitude of the feedback current when the feedback signal is less than the first threshold voltage level.

9. The method of claim 6, wherein:
a resistance value of the feedback resistor remains fixed during operation of the power converter.

10. The method of claim 1, further comprising:
determining that the power converter is in the discontinuous mode of operation by determining, by the primary side controller, that a voltage level of the feedback signal is below a third threshold level.

11. The method of claim 1, further comprising:
during the discontinuous mode of operation, determining that the power converter is in a no-load or ultra-light load mode of operation by determining, by the primary side controller, that a period between enabling pulses of the primary side switch surpasses a threshold amount of time.

12. The method of claim 1, wherein:
the normal mode of operation of the power converter is a quasi-resonant mode of operation.

13. A power converter, comprising:
a primary side controller at a primary side of the power converter;
a feedback circuit that provides a feedback signal from a secondary side of the power converter to the primary side controller; and
a primary side switch at the primary side of the power converter;
wherein the primary side controller is operable to:
during a discontinuous mode of operation of the power converter, issue a first enabling pulse to the primary side switch to reduce a voltage amplitude of the feedback signal in response to determining that the voltage amplitude of the feedback signal is greater than or equal to a first threshold voltage level;
enter a normal mode of operation of the power converter in response to determining that the voltage amplitude of the feedback signal is greater than or equal to a second threshold voltage level; and
issue a second enabling pulse to the primary side switch of the power converter during the normal mode of operation of the power converter, the voltage amplitude of the feedback signal being less than the first threshold voltage level during the normal mode of operation of the power converter.

14. The power converter of claim 13, further comprising:
a first comparator circuit of the primary side controller;
wherein determining that the voltage amplitude of the feedback signal is greater than or equal to the first threshold voltage level comprises:
receiving the feedback signal at the first comparator circuit; and
comparing, by the first comparator circuit, the feedback signal to the first threshold voltage level to generate a first comparison signal, the first enabling pulse being issued in response to a state of the first comparison signal.

15. The power converter of claim 14, further comprising:
a second comparator circuit of the primary side controller;
wherein determining that the voltage amplitude of the feedback signal is greater than or equal to the second threshold voltage level comprises:
receiving the feedback signal at the second comparator circuit; and
comparing, by the second comparator circuit, the feedback signal to the second threshold voltage level to generate a second comparison signal, wherein entering the normal mode of operation of the power converter is in response to a state of the second comparison signal.

16. The power converter of claim 15, further comprising:
an analog to digital converter (ADC) circuit of the primary side controller;
wherein issuing the second enabling pulse to the primary side switch of the power converter during normal operation of the power converter comprises:
receiving the feedback signal at the ADC;
generating, by the ADC circuit, a digital representation of the feedback signal; and
issuing, by the primary side controller, the second enabling pulse based on the digital representation of the feedback signal.

17. The power converter of claim 13, wherein the primary side controller is operable to:
allow the voltage amplitude of the feedback signal to rise towards the voltage amplitude that is greater than or equal to the first threshold voltage level by suspending, by the primary side controller, issuance of enabling pulses to the primary side switch of the power converter until the feedback signal is greater than or equal to the first threshold voltage level.

18. The power converter of claim 13, further comprising:
a feedback resistor coupled between a feedback voltage rail of the power converter and a node of the feedback circuit, the feedback signal being developed based on a current flow through the feedback resistor.

19. The power converter of claim 18, wherein:
the first threshold voltage level is about 90% of a voltage level of the feedback voltage rail; and
the second threshold voltage level is about 98% of the voltage level of the feedback voltage rail.

20. The power converter of claim 18, wherein:
a resistance value of the feedback resistor remains fixed during operation of the power converter.

* * * * *